United States Patent [19]

Rosenberg

[11] 3,824,001

[45] July 16, 1974

[54] COSMETIC MIRROR

[75] Inventor: Arthur Rosenberg, Evanston, Ill.

[73] Assignee: Creative Concepts Corporation, Chicago, Ill.

[22] Filed: Mar. 29, 1973

[21] Appl. No.: 345,835

[52] U.S. Cl.............. 350/305, 40/25 B, 350/300, 248/474
[51] Int. Cl.............................................. G02b 5/08
[58] Field of Search........... 350/288, 299, 300, 305, 350/308; 40/25 B; 248/474, 469

[56] References Cited
UNITED STATES PATENTS

| | | | |
|---|---|---|---|
| 3,493,295 | 2/1970 | Kobrehel | 350/300 |
| 3,526,763 | 9/1970 | Dorfman | 350/305 |

Primary Examiner—John K. Corbin
Assistant Examiner—Michael J. Tokar
Attorney, Agent, or Firm—Glenn E. Klepac; Michael G. Berkman; Kegan, Kegan & Berkman

[57] ABSTRACT

A cosmetic mirror comprising a hollow spherical shell and a pair of framed, back-to-back mirrors pivotally hinged within the shell to allow selection of either mirror by simple rotation. A cup-shaped base supports the shell and allows positioning of the mirrors in any desired direction. A distortable collar on the shell facilitates insertion and removal of the mirrors.

2 Claims, 8 Drawing Figures

PATENTED JUL 16 1974

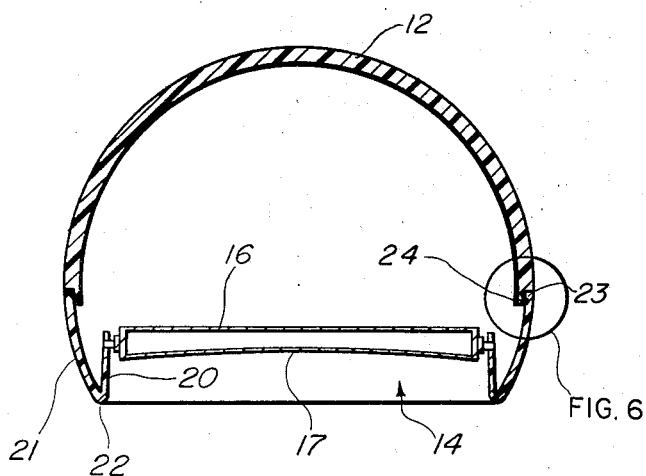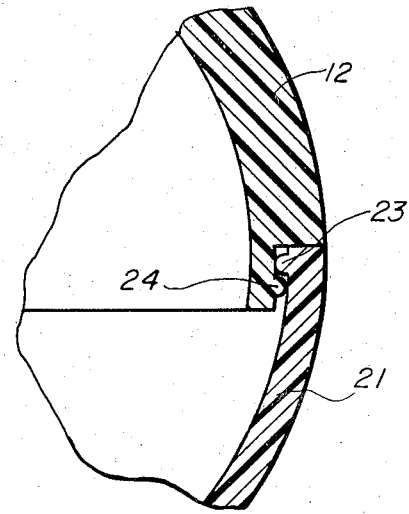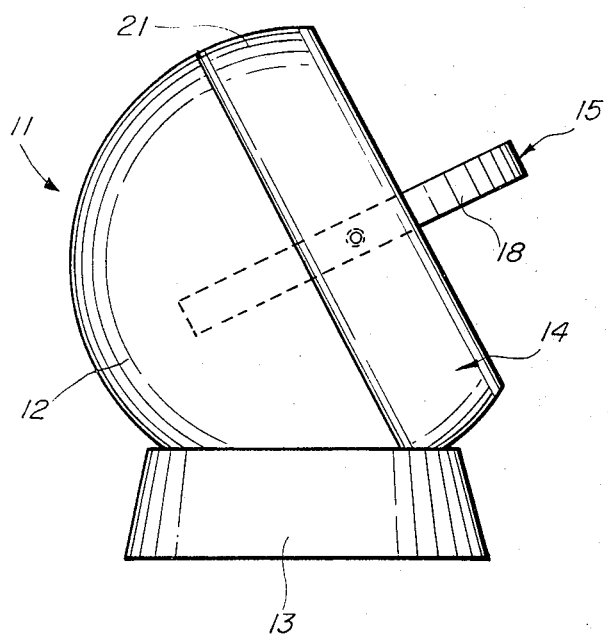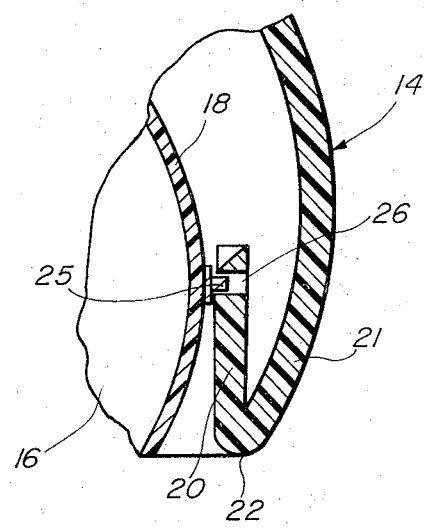

COSMETIC MIRROR

Many different types of cosmetic mirrors for use on bedroom and bathroom tables are known in the prior art. However, each of these suffers from disadvantages rendering them less than completely suitable for their intended purpose. For example, no prior art rotatable mirror is known which is also selectably positionable by shifting a spherical housing on a cup-shaped base. There exists no other mirror which is rotatable about an axis and which includes a spherical housing, to prevent breakage and to lend a pleasant aesthetic appearance. Other rotatable mirrors are difficult to replace because they are rigidly fastened to a base or other housing.

It is a principal object of the present invention to provide a dual, two-faced cosmetic mirror housed and supported in a spherical shell, and which is positionable both by axial rotation about hinge elements, and by pivoting or tilting the shell in a cup-shaped base.

It is a related object of the invention to provide a rotatable hinged cosmetic mirror which is readily insertable into and removable from its housing.

Another object of the invention is to provide a simple housing for a rotatable cosmetic mirror which will protect the mirror from scratches and breakage.

It is a further object of the invention to combine all of the above-mentioned features in a device having an aesthetically pleasing appearance and which is inexpensive to manufacture.

These and other objects and advantages of the invention will become apparent to persons skilled in the art upon reading the following specification in conjunction with the drawings, in which:

FIG. 5 is a horizontal cross-sectional view taken substantially on the line 5—5 of FIG. 2;

FIG. 6 is an enlarged fragmentary cross-sectional view of a portion of the housing circled in FIG. 5, illustrating mechanical interlock between the collar and the hemispherical shell of the mirror housing;

FIG. 7 is a side elevational view of the mirror assembly with the housing tilted and the frame mirrors pivoted at an angle with respect to the truncated spherical shell; and FIG. 8 is an enlarged fragmentary side cross-sectional view, being a detail of FIG. 5, illustrating the manner in which the mirror frame is pivotally supported in the collar which is secured to the housing.

Figure 1:
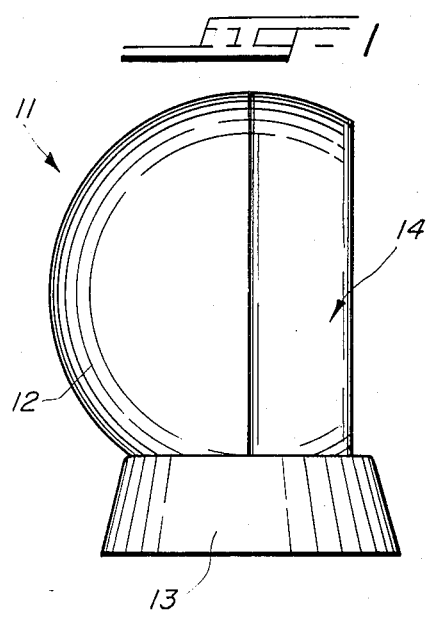
FIG. 1 is a side elevational view of the mirror assembly of the invention.
Figure 2:
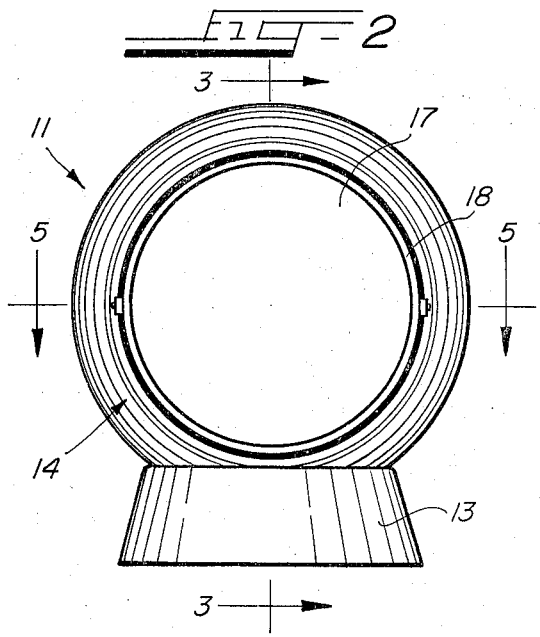
FIG. 2 is a front elevational view.

Referring now to the drawing and, more particularly to FIGS. 1, 2 and 7, the mirror assembly 11 of the invention consists of a hollow generally hemispherical shell or housing 12 and a cup-shaped base 13, the latter being contoured generally to correspond to the outer shape of the housing 12. A circular collar means or collar 14 surrounds the opening of the housing 12 and is secured thereto.

In FIGS. 2 and 5 there is shown a generally two-faced framed mirror 15 pivotally mounted within the collar 14. The framed mirror 15 includes first and second mirrors or mirror faces 16 and 17 of different focal lengths, disposed back-to-back. In the preferred embodiment shown in FIG. 5 the rearwardly directed face 16 is flat and the forwardly presented mirror face 17 is concave. A cylindrical band means or band 18 frames the mirrors 16 and 17 and binds them together.

Figure 3:
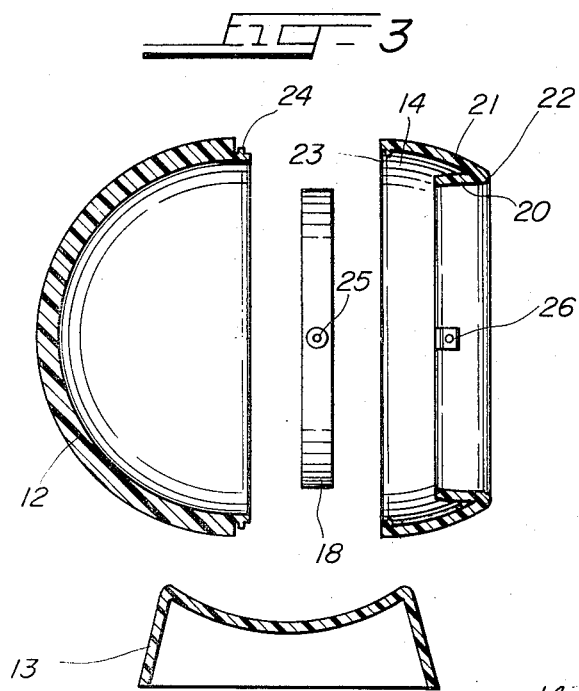
FIG. 3 is an exploded view, partly in section, taken substantially on the line 3—3 of FIG. 2.
Figure 4:
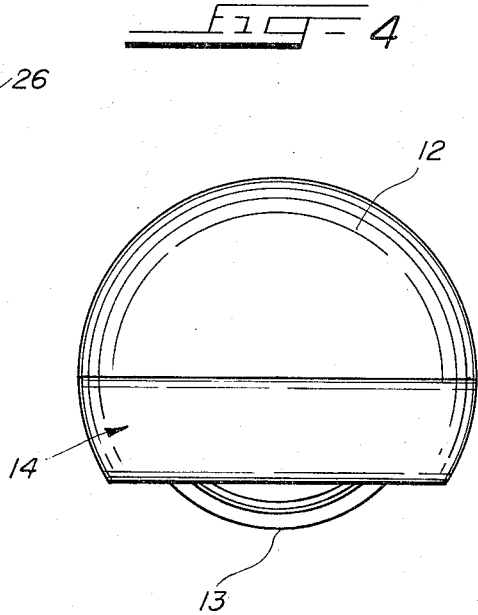
FIG. 4 is a top plan view of the mirror assembly of FIG. 2.

As illustrated in FIGS. 3, 5 and 8, the collar 14 consists of an annular inner flange 20 and an overlying annular outer flange 21 joined to the inner flange 20 along an annular ring-like juncture or edge 22. The inner flange 20 is generally cylindrical and the outer flange 21 constitutes a substantially uninterrupted extension of the shell 12. In the preferred embodiment illustrated, the collar 14 and the shell 12 are of constrasting colors in order to produce a more desirable aesthetic effect. The collar 14 also serves as a shield to protect the mirrors 16 and 17 from scratches and breakage, since the mirrors 16 and 17 are recessed rearwardly of the annular edge 22 of the collar 14.

Thread-like coupling means 23 and 24 bind the collar 14 to the shell 12, as shown in detail in FIGS. 5 and 6. An inner surface of the outer flange 21 of the collar 14 is provided with ridges 23 which interlock with alternating cooperating projections 24 raised on the surface of the shell 12. In the preferred embodiment shown, the respective coupling means are joined by twisting the shell 12 and the collar 14 together in a simple spiral motion. Other suitable coupling means such as cooperating flexible tabs adapted to slide past one another may also be utilized. Friction securement means may also be used.

The outer band 18 framing the mirrors 16 and 17 is provided with two cooperating posts 25 or bosses extending directly outwardly from diametrically opposed peripheral positions on the band 18, as shown in FIGS. 3, 5 and 8. The inner flange 20 is provided with two socket means or sockets 26 corresponding to the respective posts 25. The posts 25 and sockets 26 are spaced in relation to each other to establish two opposed post-socket junctions, each constituting a pivotal hinge connection between the frame-carried mirrors 15 and the collar 14. If desired, the posts and sockets can be interchanged by placing the two posts 25 on inwardly directed surfaces of the inner flange 20, with the respective sockets 26 being formed in corresponding peripheral positions on the band 18.

The mirrors 15 are thus rotatable to different positions within the shell, about an axis corresponding to a line connecting the posts 25, as illustrated in FIG. 7. The mirrors 15 may be further positioned by shifting the shell 12 on its base 13, as shown in FIG. 7.

The collar 14 is made of a resiliently deformable material, preferably substantially rigid molded plastic, in order to facilitate insertion and removal of the frame-carried mirrors 15 into and from the shell 12. When force is applied radially inwardly of the outer flange 21 of the collar 14, in a direction normal to an axis defined by the sockets 26, the sockets 26 are displaced outwardly of each other. When sufficient force is applied, the sockets 26 are separated sufficiently to permit the posts 25 to be inserted into or removed from their respective sockets 26. When the distorting force is released, the sockets 26 return inwardly into engagement with the posts 25.

It will be appreciated that this invention has been described with reference to a preferred embodiment and preferred structural materials and that other embodiments will suggest themselves to persons skilled in the art. For example, instead of carrying a pair of mirrors back-to-back, the rotatable frame may carry photographs, diffracting viewing surfaces and the like, with or without mirror elements.

What is claimed is:

1. In an assembly for displaying mirrors, photographs and the like and including a pair of mirrors and a hollow, generally spherical, cup-shaped shell constituting a housing for said mirrors;

the improvement comprising:

band means constituting a frame for said mirors and securing said mirrors in a back-to-back arrangement, hinge means pivotally supporting said frame and said mirrors within said shell for selectable full rotational positioning of said mirrors about a hinge-defined axis, whereby each of said mirrors is selectably positionable for viewing at any desired angle, said hinged means comprising, in combination, socket means formed in said shell at diametrically opposed locations therein, and a pair of cooperating posts, said posts extending outwardly from said band means at diametrically opposed positions thereof, spacing between said respective said socket means and spacing between said posts being physically dimensioned in relative correspondence to facilitate intercoupling projection of said posts into corresponding said socket means to establish a pivotal hinge for full 360° rotation of each of said frame and the frame-carried said mirrors to any selectable viewing position for each said mirrors, said shell being resiliently deformable under distorting stress applied thereto, whereby upon application of distorting force to said shell radially inwardly of and normal to a diameter of said shell defined by a line connecting said socket means, said socket means are displaced outwardly of each other to a limited but sufficient extent to facilitate insertion into and removal of said posts from engagement with said socket means, thereby to facilitate insertion and removal of the frame-carried said mirrors into and from the shell of the mirror assembly.

2. The structure as set forth in claim 1 wherein said housing for said mirrors includes collar means consisting essentially of a generally cylindrical annular inner flange and an annular outer flange integral therewith and overlying said inner flange and joined thereto along an annular ring-like edge, said outer flange constituting a substantially uninterrupted extension of said shell; and coupling means integrally formed with respective said shell and said collar means for connecting said collar to said shell.

* * * * *